United States Patent
Kelsey et al.

(10) Patent No.: US 6,657,044 B1
(45) Date of Patent: Dec. 2, 2003

(54) PROCESS FOR MAKING POLYTRIMETHYLENE TEREPHTHALATE

(75) Inventors: Donald Ross Kelsey, Fulshear, TX (US); Kathleen Suzanne Kiibler, Katy, TX (US); Wen Tzung Tang, Sugar Land, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/274,317

(22) Filed: Oct. 18, 2002

Related U.S. Application Data
(60) Provisional application No. 60/341,000, filed on Oct. 30, 2001.

(51) Int. Cl.[7] .................... C08K 6/00; C08K 3/10
(52) U.S. Cl. .................... 528/485; 528/275; 528/278; 528/279; 528/280; 528/281; 528/283; 528/285; 528/308.6; 528/488; 528/489; 528/495; 528/503; 524/765; 524/780; 524/783; 524/784; 524/785; 524/787; 524/788
(58) Field of Search .................... 528/275, 278, 528/279, 280, 281, 283, 285, 308.6, 485, 488, 489, 495, 503; 524/765, 780, 783, 784, 785, 787, 788

(56) References Cited

U.S. PATENT DOCUMENTS

| | | | |
|---|---|---|---|
| 4,418,188 A | 11/1983 | Smith et al. | 528/274 |
| 4,424,337 A | 1/1984 | Smith et al. | 528/274 |
| 4,835,247 A | 5/1989 | Wilson et al. | 528/272 |
| 4,921,929 A | 5/1990 | Wilson et al. | 528/272 |
| 6,245,879 B1 | 6/2001 | Kelsey et al. | |
| 6,277,947 B1 | 8/2001 | Kelsey et al. | |
| 6,281,325 B1 * | 8/2001 | Kurian et al. | 528/279 |
| 6,335,421 B1 * | 1/2002 | Kurian et al. | 528/279 |
| 2002/0123606 A1 * | 9/2002 | Kurian et al. | 528/279 |

FOREIGN PATENT DOCUMENTS

| | | |
|---|---|---|
| EP | 1046662 | 4/1999 |
| WO | WO 98/49216 | 11/1998 |

OTHER PUBLICATIONS

International Search Report of Mar. 18, 2003.

\* cited by examiner

*Primary Examiner*—Samuel A. Acquah
(74) *Attorney, Agent, or Firm*—Donald F. Haas

(57) ABSTRACT

An improved process for the polymerization of polytrimethylene terephthalate by esterification of terephthalic acid or dimethylterephthalate with 1,3-propanediol (PDO), precondensation of the esterification product to produce a precondensation product, and polycondensation of the precondensation product to produce polytrimethylene terephthalate wherein excess PDO is removed from the esterification and/or polycondensation stages and PDO vapor is separated from the high boiling fraction (solid byproduct). The improvement comprises:

(a) heating the solid byproduct in the presence of about 5 ppm to about 5000 ppm, based on metal, of a metal catalyst selected from the group consisting of one or more 3rd, 4th, or 5th row metal compounds from Groups 3–12 and Groups 14–15 of the Periodic Table (IUPAC 1989) at a temperature of from about 100° C. to about 240° C. for from about 5 minutes to about 24 hours, optionally in the presence of a diluent, and (b) optionally, recycling the reaction product into the polymerization process.

45 Claims, 1 Drawing Sheet

PROCESS FOR MAKING POLYTRIMETHYLENE TEREPHTHALATE

This application claims the benefit of U.S. Provisional Application No. 60/341,000 filed Oct. 30, 2001, the entire disclosure of which is hereby incorporated by reference.

FIELD OF THE INVENTION

This invention relates to a process of producing polytrimethylene terephthalate by esterification of terephthalic acid with 1,3-propanediol, precondensation of the esterification product to obtain a precondensation product, and polycondensation of the precondensation product to obtain polytrimethylene terephthalate, wherein the 1,3-propanediol is recycled. More specifically, the present invention relates to an improvement in the recycle of the 1,3-propanediol wherein solid byproducts are converted into liquid or semi-liquid form.

BACKGROUND OF THE INVENTION

The preparation of polytrimethylene terephthalate (PTT) involves the reaction of terephthalic acid (TPA) or dimethylterephthalate (DMT) and excess 1,3-propanediol (PDO) at elevated temperatures, 240 to 275° C., optionally in the presence of an esterification catalyst such as a catalytic titanium compound, to obtain an esterification product which is usually a relatively low intrinsic viscosity PTT. This esterification product is then subjected to precondensation and finally the precondensation product is subjected to polycondensation to obtain PTT. In some processes, this is followed by solid state polymerization to increase the intrinsic viscosity of the PTT but there is a new process which can produce high intrinsic viscosity PTT without solid state polymerization.

In the PTT process, the excess PDO (which contains a number of materials which have to be removed before the PDO can be recycled) removed from the prepolymer (precondensation) and polycondensation stages can be distilled to recover purified PDO for reuse in the process. The PDO recovery typically consists of boiling and separating PDO vapor from high boiling fraction (distillate bottoms; solids and semi-solids). Further purification of PDO in a distillation column or other such means can be effected.

The instant invention is a process that chemically converts the solid and semi-solid byproducts (distillate bottoms, herein collectively described as "solid byproduct") into compositions that are flowable liquids or fluids at practical temperatures. These compositions, which can be homogeneous solutions or non-homogeneous suspensions, are lower in viscosity than the starting byproducts and, therefore, are easier to handle for disposal and/or recycle to the process. Preferably, these flowable liquids or fluids will have a viscosity of less than about 500 mPa·s at 100° C.

SUMMARY OF THE INVENTION

This invention is an improvement upon the known process for polymerization of PTT by esterification of TPA or DMT with PDO, precondensation of the esterification product to produce a precondensation product, polycondensation of the precondensation product to produce PTT, and purification of the excess PDO which can then be recycled. In the PDO purification stage, the excess PDO removed from the precondensation and/or polycondensation stages is distilled to recover purified PDO for reuse in the process. The PDO containing stream is boiled and PDO is separated from the high boiling byproduct fraction (distillate bottoms—solid byproduct) which are the solids and semi-solids referred to above. Another step further purifies the PDO in, for example, a distillation column which can be combined with or separate from the initial fractionation.

The improvement comprises heating the solids and semi-solids (solid byproduct) in the presence of a metal catalyst which digests and converts the solid byproduct (sludge) to esters of terephthalic acid, primarily the di-PDO ester [bis (3-hydroxypropyl) terephthalate]. The metal catalyst is selected from one or more 3rd, 4th, or 5th row metal compounds from Groups 3–12 and Groups 14–15 of the Periodic Table (IUPAC 1989). Metal salts based on La, Ti, Zr, V, Cr, Mn, Ru, Co, Ni, Zn, Sn, and Sb are preferred. Catalysts based on Ti, Zn, and Sn are most preferred because of their higher reactivity, and compatibility with the PTT polymerization process, especially if the digestion product is to be recycled. The amount of catalyst is that which effects the desired conversion ("digestion") under the reaction conditions. This is generally 5 ppm (based on metal) to about 5000 ppm, preferably from about 10 ppm to about 500 ppm.

The temperature of the conversion reaction may range from about 100° C. to about 240° C. If the reaction takes place in a separation vessel, the recommended range is about 140° C. to about 240° C., the preferred range is from about 180° C. to about 240° C., and the most preferred range is about 210° C. to about 230° C. The reaction ("digestion"), when carried out in a separate reaction vessel, is conducted at temperatures from about 100° C. to about 220° C., preferably from about 120° C. to about 200° C., and most preferably from about 140° C. to about 180° C. Reaction times can range from a few minutes to several hours. Preferably, the reaction time will be from about 5 minutes to about 24 hours, most preferably from about 10 minutes to about 2 hours. A fluid product, preferably having a viscosity of less than about 500 mPa·s at 100° C., is produced.

In one embodiment, the excess PDO containing the byproducts are transferred to a separation vessel, i.e., distillation column, flasher, or similar vessel, where the PDO vapor is removed overhead, leaving a more concentrated solid byproduct stream which is transferred to a separate reaction vessel where the catalyst is added and the digestion (conversion reaction) takes place.

In another embodiment, the catalyst is added to the separation vessel used for PDO recovery and the digestion takes place in situ there.

In a third embodiment, the PDO recovery stage (separation vessel) is partially or completely skipped and the solid byproduct is transferred from the vacuum condenser systems of the precondensation and/or polycondensation stages (wherein 1,3-propanediol vapor is separated from solid byproduct) to a reaction vessel wherein the catalyst is added and the digestion reaction takes place.

In a fourth embodiment, the excess PDO is transferred to a separation vessel which is part of the esterification stage of the process (wherein 1,3-propanediol vapor is separated from solid byproduct) wherein the catalyst is added to the separation vessel, i.e., distillation column, flasher, or similar vessel, and the digestion reaction takes place there, preventing the formation of a large amount of solid byproduct.

DETAILED DESCRIPTION OF THE INVENTION

Figure 1:
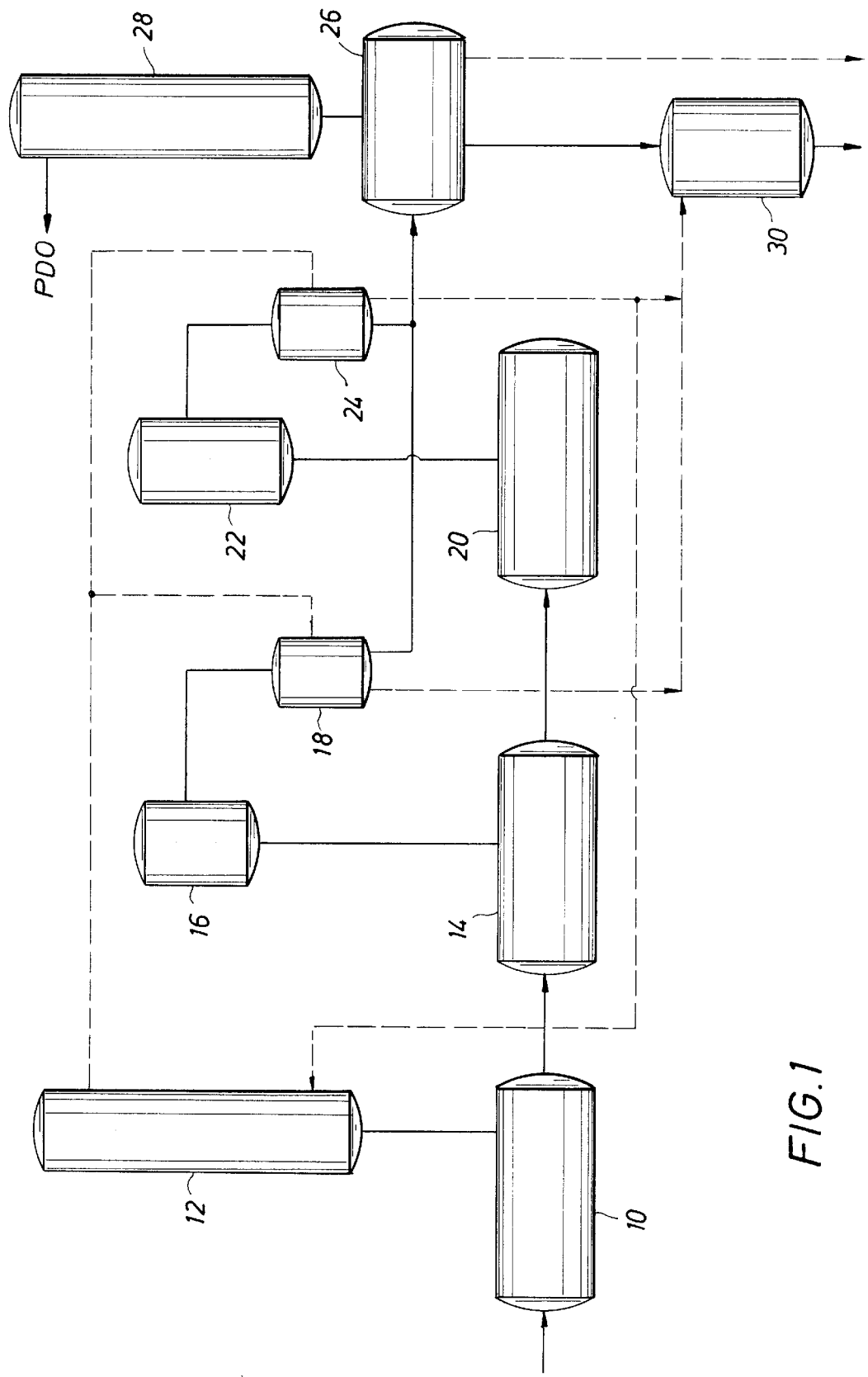
FIG. 1 shows one possible very simplified scheme for carrying out four of the embodiments of this invention.

PTT can be prepared by reacting 1,3-propanediol (PDO) and terephthalic acid (TPA) or dimethylterephthalate (DMT)

optionally including other diols and/or aromatic diacids or diesters thereof, with removal of byproduct water (or alcohol), for a time effective to produce a polyester having an intrinsic viscosity of at least about 0.6 dl/g as measured in 60/40 phenol/tetrachloroethane at 25° C. In one variation of this process, a PDO based polyester such as PTT may be prepared in a two-stage condensation polymerization process.

The first stage, melt polycondensation, includes two steps: a "pressure step" followed by a "vacuum step." In the pressure step (esterification), excess PDO is reacted with the diacid or alkyl ester thereof, optionally in the presence of added catalyst (an esterification catalyst such as a transition metal catalyst, especially titanium or tin can be used) at a temperature within the range about 240 to about 275° C. under atmospheric or superatmospheric pressure. Water or alcohol is produced as a byproduct and is removed by suitable means such as overhead distillation. PDO may be recovered from the esterification separation vessel (distillation column, flasher, etc.) and recycled.

For the vacuum step of the melt polycondensation, the pressure on the reaction mixture is reduced and a catalyst is usually added. The preferred polycondensation catalysts are compounds of titanium or tin, such a titanium butoxide, present in an amount within the range of about 10 to about 400 ppm titanium or tin, based on the weight of the polymer. This step is commonly divided into the precondensation stage and the polycondensation stage, mainly as a way to reduce the pressure gradually. The low molecular weight product of the first step is heated at a temperature within the range of about 240 to about 275° C. under less than atmospheric pressure for a time effective to increase the intrinsic viscosity of the starting material to at least about 0.5 dl/g. PDO containing dissolved and solid high boiling byproducts is typically removed from these stages and treated to recover PDO.

The reaction product of the melt stage is cooled, solidified, and optionally formed into pellets. The polymer can optionally then be polycondensed in solid form ("solid-stated") at an elevated temperature less than the target polymer melt point, generally (for PTT) at a temperature greater than about 180° C. and preferably above about 200° C., under reduced pressure and/or an inert gas stream. The solid stating stage is carried out for a time, generally about four hours or more, sufficient to produce a polyester having an intrinsic viscosity of at least about 0.8, generally within the range of about 0.9 to about 1.1 dl/g.

There is also a new continuous melt process for producing PTT which does not require the solid stating stage to reach high intrinsic viscosity. This process is described in U.S. Pat. No. 6,277,947, which is herein incorporated by reference.

In the PDO purification part of the process, the excess PDO removed from the precondensation and/or polycondensation stages by vacuum may be condensed and sent to a distillation column or other such means (the vacuum condensers) to recover purified PDO, usually for reuse in the process. The PDO recovery process boils and separates PDO vapor from high boiling fractions (distillate bottoms), most significantly, i.e., the solid byproduct. This separation can be accomplished, for example, by a distillation column equipped with a thermosyphon or forced circulation type reboiler or by heating the spent PDO in a heat exchanger or flashing off PDO vapor in a flash vessel ("flasher") to separate the high boiling fraction and solids from the PDO. The heavy or high boiling fraction (distillate bottoms-solid byproduct) generated consists of a mixture of PTT oligomers, cyclic dimer, PDO, and compounds with a boiling points higher than PDO. This bottoms product or "sludge" is a solid or semi-solid at room temperature and at temperatures over 100° C.

The instant invention is a process that chemically converts the solid byproduct into compositions that are flowable fluids at practical temperatures. These compositions, which can be homogeneous solutions or non-homogeneous suspensions, are lower viscosity than the solid byproduct and, therefore, are easier to handle for disposal and/or recycle to the process.

The improvement comprises heating the solid byproduct in the presence of a metal catalyst which converts the solid byproduct (sludge) to esters of terephthalic acid, primarily the di-PDO ester [bis(3-hydroxypropyl) terephthalate]. In the first embodiment of the invention, the reaction can be conducted in a suitable separate reactor by transferring the solid byproduct from the PDO recovery process described above to said reactor, adding catalyst and optional diluent, and providing mixing and heating at the desired time and temperature.

A preferred mode (second embodiment) of conducting this digestion reaction, however, is to add catalyst to the PDO distillation vessel, for example to the bottom stage or the reboiler of the first distillation column or to the flash vessel as described above, so that the digestion reaction of the solid byproduct takes place in situ during the recovery distillation of the PDO distillate. In this case, the optional diluent referred to below is preferably not added until after the digested product is removed from the distillation vessel.

Referring to FIG. 1, in one possible scheme to carry out the four embodiments summarized above, the reactants enter the esterification vessel(s) 10 which has distillation column(s) 12 to treat the overheads from vessel(s) 10 and recover purified PDO therefrom which can be recycled into vessel 10. The product from vessel(s) 10 is transferred into the precondensation vessel(s) 14 which is under a vacuum. The overheads are removed by a vacuum system (16) and condensed in vessel(s) 18, the vacuum condenser(s). The product from the precondensation vessel(s) 14 is transferred into polycondensation vessel(s) 20. The polycondensation vessel(s) has a similar vacuum system (22) and vacuum condenser vessel(s) 24 to remove water, PDO, and solid byproduct. The reactions carried out in 10, 14, and 20 can be carried out in more than one vessel.

In the first embodiment, the PDO (containing soluble and insoluble high boiling byproducts) from vessels 18 and/or 24 is removed to flasher 26 which separates purified PDO, which can be further purified in distillation column(s) 28, and the concentrated solid byproduct stream which contains, for example, perhaps about 50 percent by weight solids. This solid byproduct stream is transferred into the digestion reaction vessel 30 to which is added catalyst and optional diluent. Therein the solid byproduct is converted into a lower viscosity, liquid or semi-liquid byproduct stream which is more easily handled for disposal or recycle.

The dotted lines in FIG. 1 describe embodiments 2–4. In the second embodiment, the condensed PDO containing the dissolved or suspended high boiling byproducts from condensers 18 and/or 24 is transferred into flasher 26 and the catalyst is added directly into this vessel wherein the digestion reaction takes place. The solid byproduct is converted into liquid or semi-liquid byproducts in situ in flasher 26 (and the separate vessel 30 is not used) and subsequently removed for disposal and/or recycle to the process.

In the third embodiment, the PDO recovery process (column, flasher, etc. vessels 26 and 28) is partially or entirely skipped for purposes of treating the solid byproduct. The solid byproduct is isolated, e.g. by filtration or sedimentation, from the PDO distillates in the precondensation vacuum condenser 18 and/or the polycondensation vacuum condenser 24, which byproducts are sometimes referred to as "condenser solids" or "spray loop condensate" and variations thereof, and transferred to digestion reaction vessel 30 wherein the catalyst and optional diluent are added and the digestion reaction takes place. The remaining PDO from condenser 18 and/or 24, containing less byproducts, can be recovered in the PDO recovery stage (vessels 26 and 28) and/or recycled directly to the process.

Known systems for making polytrimethylene terephthalate and polyethylene terephthalate do not incorporate a vessel having the function of vessel 30 described herein. The addition of metal catalyst to the distillation systems (column 12 and/or vessel 26) is novel with respect to prior art polyester processes. In such processes, catalyst is generally added only in the equivalent of 10, 14, and/or 20.

The intent of the fourth embodiment of the present invention is to prevent, as much as possible, the formation of the solids byproduct, especially when excess PDO distillate is recycled without extensive purification. In this embodiment, the digestion catalyst is added directly to the esterification distillation column 12 and the digestion reaction takes place therein. The liquid or semi-liquid byproducts are optionally removed from column(s) 12 and PDO is recycled to vessel(s) 10. The presence of the digestion catalyst in the distillation system prevents, to a great extent, the formation of solids byproduct that can cause column fouling. Optionally, the PDO condensate from vessels 18 and/or 24 can be transferred to column(s) 12, bypassing the PDO purification section (vessels 26 & 28), in which case it is even more desirable to effect the digestion reaction of the invention in column(s) 12. Optionally, a small stream of reactive heavy components (containing solid byproduct) can be purged from the bottom of column 12 and directed to digestion reaction vessel 30 for treatment in order to avoid buildup of impurities in column 12 or, since the amount of solid byproduct should generally be low, this small stream could be directed to the PDO recovery stage (vessels 26 and 28) or disposed of.

The embodiments described above can be employed separately or in various combinations using equipment well-known in the art and can be conducted in batch, semi-batch, semi-continuous or continuous fashion.

Optionally, a liquid organic diluent can be added. The optional diluent preferably is 1,3-propanediol (PDO), especially if the digestion product is to be recycled to the PTT process. Other organic liquid diluents can be used. Those most compatible with PDO and the di-PDO ester are alcohols and glycols, such as ethylene glycol, 1,2-propylene glycol, 1,4-butanediol, diethylene glycol, triethylene glycol, and the like. In the case where the final digested product is to be disposed of, impure diluents are preferred because of their lower cost, e.g. unpurified ethylene glycol recovered from a PET process. The optional diluent can be added to the recovered PDO and/or condenser loop solids before or during the digestion reaction, or it can be added after the digestion reaction.

The metal catalyst is selected from one or more 3rd, 4th, or 5th row metal compounds from Groups 3–12 and Groups 14–15 of the Periodic Table (IUPAC 1989). Metal salts based on La, Ti, Zr, V, Cr, Mn, Ru, Co, Ni, Zn, Sn, and Sb are preferred. Catalysts based on Ti, Zn and Sn are most preferred because of their higher reactivity and compatibility with the PTT polymerization process, especially if the digestion product is to be recycled. The amount of catalyst is that which effects the desired conversion ("digestion") under the reaction conditions. This is generally about 5 ppm (based on metal) to about 5000 ppm, preferably from about 10 ppm to about 500 ppm.

The temperature of the conversion reaction may range from about 100° C. to about 240° C. If the reaction takes place in a separation vessel, the recommended range is about 140° C. to about 240° C., the preferred range is from about 180° C. to about 240° C., and the most preferred range is about 210° C. to about 230° C. The reaction ("digestion"), when carried out in a separate reaction vessel, is conducted at temperatures from about 100° C. to about 220° C., preferably from about 120° C. to about 200° C., and most preferably from about 140° C. to about 180° C. Temperatures below about 180° C. are advantageous to prevent degradation of PDO. However, temperatures above about 140° C. are advantageous for faster reaction rates and for stirring, especially if the optional diluent is not added at this stage.

Reaction times can range from a few minutes to several hours and, as will be recognized by one skilled in the art, can depend on the temperature, the catalyst, the amount of catalyst, and the amount of solid byproduct. Preferably, the reaction time will be from about 5 minutes to about 24 hours, most preferably from about 10 minutes to about 2 hours. It is significant that the reaction temperatures used for this invention are considerably lower than the normal polymerization temperatures, typically about 240 to about 280° C., used for making polymer because the reaction rates for the chemical reactions that occur during the digestion reaction are typically much slower at these lower temperatures, even in the presence of the metal catalysts, than they are at normal polymerization temperatures.

Optionally, basic catalysts can also be used but are not preferred because they can form undesirable salts of terephthalic acid which are insoluble in PDO at high concentrations. However, basic catalysts can be used in combination with the metal catalysts. Examples of basic catalysts are the salts of the alkali and alkaline earth metals (Groups 1 and 2), such as hydroxides, carbonates, and bicarbonates. Typical levels of basic catalysts, if used, are about 0.01 to about 2 wt percent, based on total catalyst. Carboxylate salts, such as acetates and terephthalates also can be used as well as alkoxides, such as methoxides or ethoxides. Sodium, potassium, rubidium, magnesium, calcium, and strontium bases are preferred, most particularly sodium and potassium hydroxides and carbonates.

The reaction product of our process can be a homogeneous solution or a non-homogeneous suspension or mixture which has a viscosity lower than the viscosity of the starting byproduct mixture. The viscosity of the reaction product mixture measured at 100° C. is preferably less than about 500 mPa·s, preferably less than about 300 mPa·s, and most preferably less than about 100 mPa·s. The composition of the reaction product comprises primarily PDO, the di-PDO esters, and the optional diluent. In the case where the optional diluent is an alcohol or glycol, the product may also contain TPA esters derived from the diluent.

Once the solid byproduct is converted into the liquid or semi-liquid form by the instant process, the reaction product can be optionally recycled to the PTT process. In the case of solid byproduct isolated from the vacuum condensers, which may be spray loop condensers, rather than from the PDO distillation recovery, the digested product may be pure enough to be added to the PTT process (in the paste feed, esterification stage, or prep blymerization stage) without further purification.

In the case of the PDO distillate bottoms, direct recycle of the digested reaction product is less likely because the bottoms (and the digestion product) contain high amounts of color bodies.

Solid organic byproducts, such as the PDO distillate bottoms and spray loop solids, are more difficult to handle. At ordinary temperatures below about 120° C., these byproducts are solid or highly viscous, which prevents or hinders transfer by pumping without special equipment.

Solids can be more expensive to dispose of than liquid wastes. For example, burning can be more efficient and less costly than landfill or other means of disposal, but some facilities, such as cement kilns, may be able to handle only liquid wastes or small lots of solid organic wastes. The instant invention converts the solid PTT waste materials into a liquid or flowable form (low viscosity) at reasonable temperatures, thereby facilitating handling and disposal.

Recycle of the undigested solid byproducts to the PTT process is impractical. However, by converting these byproducts into lower viscosity fluids or suspensions, it is feasible to transfer them to appropriate points in the process for recycle. This not only saves raw material costs but also disposal costs.

$M_n$=346. The material was transferred to the viscometer flask and the viscosity measured at 60, 80, 100 and 120° C. The results are shown in Table 1.

Examples 2–4. Similarly, the sludge was diluted with PDO prior to digestion with Ti catalyst. For a ratio of 0.35 diluent/sludge, 16.1 gm PDO was added to 30 gm sludge and digested with 0.132 gm Ti butoxide catalyst. For 0.25 diluent/sludge, 11.5 gm PDO was added to 30 gm sludge. For 0.12 ratio, 6 gm PDO was added to 50 gm of sludge and digested with 0.06 gm Ti butoxide.

NMR analysis of the product from the digestion of the 0.35 PDO/sludge showed about 1.5 wt % cyclic dimer and 38% oligomer of $M_n$=288 ($M_n$ of the di-PDO ester of terephthalic acid is 282).

Example A was conducted essentially as in Example 1 but without addition of catalyst. NMR analysis showed about 15 wt % cyclic dimer and 42 wt % oligomers of $M_n$=347.

TABLE 1

| Temp. | Example A<br>No dilution<br>No catalyst | | Example 1<br>No dilution<br>~54% solids | | Example 2<br>0.12 PDO/sludge<br>~50% solids | | Example 3<br>0.25 PDO/sludge<br>~34% solids | | Example 4<br>0.35 PDO/sludge<br>~29% solids | |
|---|---|---|---|---|---|---|---|---|---|---|
| ° C. | Viscosity | | Viscosity | | Viscosity | | Viscosity | | Viscosity | |
| 60 | NM | solid | NM | solid | 1525 | T | >1500 | solid | 420 | ST |
| 80 | NM | solid | 450 | T | 440 | T | 175 | T | 75 | clear |
| 100 | 680 | T | 260 | T | 85 | SO | 45 | T | <15 | clear |
| 120 | 100 | T | 10 | clear | <5 | clear | 5 | clear | <5 | clear |
| 140 | <5 | clear | | | | | | | | |

NM = too high to measure; T = turbid; ST = slightly turbid; SO = semi-opaque;

EXAMPLES

PDO Distillate Bottoms

PDO overhead distillate from the PTT polymerization was distilled and the residual material in the reactor ("sludge" or "bottoms") was recovered. The sludge contained about 54 wt % solids based on gas chromatographic analysis of about 46% PDO. NMR analysis showed about 47 wt % PDO, 13% cyclic dimer, and 40% oligomers ($M_n$=394) or about 53 wt % solids. The mixture was a soft solid at room temperature. The viscosity was measured at 100–140° C. The results are shown in Table 1, Example A. Viscosity measurements (in mPa·s) were made using a Brookfield viscometer, model DVII+, with spindle 28 at 100 rpm.

Digestion

Example 1. The sludge (30 gm) was charged to a 3-neck flask and 0.132 gm Ti(OBu)$_4$ was added under nitrogen atmosphere. The contents were heated in a 160° C. oil bath and stirred at 100 rpm for about 1 hour. NMR showed about 7 wt % cyclic dimer, 43% PDO and 50 wt % oligomer of Example 5. The distillate bottoms (29.7 gm) was heated with 0.3 gm K$_2$CO$_3$ at 160° C. for 2 hour and cooled to room temperature. The semi-solid was reheated to 170° C. with additional 0.3 gm base and then an additional 0.75 gm base, but the product was still semi-solid at room temperature. NMR showed that the product contained no cyclic dimer and about 12 wt % oligomers ($M_n$=298).

A similar control experiment in which the bottoms were heated without base showed about 16 wt % cyclic dimer and 33 wt % oligomers ($M_n$=331).

Example B. A flask was charged with 30 gm of distillate bottoms and 90 gm of PDO and heated to 160° C. in an oil bath with stirring. At about 110° C., the solids were dispersible @75 rpm stirring. At about 125° C., the material was turbid, at 150° C. it was slightly opaque, and at about 161° C. it was clear (homogeneous) and amber/brown. Even at a dilution of 3.0 PDO/sludge, the undigested material was not homogeneous at less than about 150° C.

Example 6. To the mixture of Example B was added Ti(OBu)$_4$ (0.025 gm) and the mixture heated at 160° C. for 3 hours. When cooled to room temperature, the material was turbid but liquid and easy to remove with a pipette. NMR showed about 1 wt % cyclic dimer and 18% oligomer ($M_n$=260).

The material was reheated to about 70° C. (still turbid) and 0.62 gm K$_2$CO$_3$ was added. At 100° C., the material was clear (homogeneous). NMR showed no cyclic dimer and about 19% oligomers ($M_n$ 373).

PTT Spray Loop Condensate

The solids recovered from the PTT spray loop condenser contained about 48 wt % cyclic dimer, about 7 wt % oligomers ($M_n$=343) and about 45 wt % PDO.

Example C. Spray loop solids (30 gm) were heated in a 160° C. oil bath and after about 1 hour had not melted. The solids were diluted with 16 gm PDO and after an additional 1 hour, only slight melting was observed.

Example 7 and 8. Spray loop solids (30 gm) and 15 mL PDO were heated with 0.15 gm Ti(OBu)$_4$ at 175° C. for about 2 hours to form a clear solution. Similarly, 30 gm solids, 47 gm PDO and 0.14 gm Ti(OBu)$_4$ were heated at 175° C. for 2 hours. The viscosities (in mPa·s) were measured at 60–120° C. (Table 2). NMR of the reaction diluted with 47 gm PDO showed no cyclic dimer, about 27 wt % di-PDO ester of TPA (M$_n$=285), and 73% PDO.

TABLE 2

| Temp. | Example C | | Example 7 0.5 PDO/ loop solids | | Example 8 1.6 PDO/ loop solids | |
|---|---|---|---|---|---|---|
| ° C. | Viscosity | | Viscosity | | Viscosity | |
| 60 | NM | | NM | solid | 450 | T |
| 80 | NM | | 280 | T | 100 | ST |
| 100 | NM | | 90 | ST | 10 | clear |
| 120 | NM | | <5 | clear | <5 | clear |
| 160 | NM | T/solid | | | | |

NM = too high to measure; T = turbid; ST = slightly turbid

Example 9. Similar to the process of Example 4. PDO still bottoms (30 gm) was diluted with 16.1 gm PDO and heated to 160° C. and stirred at about 75 rpm. Zinc acetate dihydrate catalyst (0.0214 gm, equivalent to about 400 ppm Zn based on bottoms solids) was added during the heatup. After about 1 hour at 160° C. (100 rpm), a sample was transferred to a viscosity tube and the viscosity (in mpa·s) measured at various temperatures (see Table).

Example 10. Similar to the process of Example 4. PDO still bottoms (35.5 gm) was diluted with 19 gm PDO and mixed with butyl stannoic acid catalyst (Fascat 4100). The reaction mixture was heated to 160° C. and stirred at 100 rpm for about 1 hour and cooled to room temperature. A 15 mL sample was transferred to a viscosity tube for measurements (see Table 3).

TABLE 3

| Temp. | Example 9 Zinc catalyst | | Example 10 Tin catalyst | |
|---|---|---|---|---|
| ° C. | viscosity | | viscosity | |
| 60 | 1625 | T | 2185 | T |
| 80 | 755 | T | 335 | T |
| 100 | 105 | ST | 105 | ST |
| 120 | 5 | Clear | 20 | Clear |

T = turbid; ST = slightly turbid; viscosity in centipoise

The data (Table 3) shows that the products from Examples 9 and 10 showed significantly lower viscosities in keeping with the instant invention. At the levels of catalyst used, the viscosities of the reaction products were somewhat higher than those found using titanium catalyst (Example 4) but still were in the desired range, especially at 100° C. or higher.

Example 11. A 10 milliliter serum bottle with a stir bar was charged with 0.125 grams of cyclic dimer (93 percent pure), 2.375 grams of PDO, and 0.008 grams of titanium tetrabutoxide. This mixture was heated up to 200° C. At 50 to 150° C., no apparent reaction occurred. Partial reaction was apparent at 175° C. and almost complete reaction occurred at 200° C. The result was that only 0.0037 grams of solids (about 3 wt %) was recovered when the solution was cooled to room temperature. This example shows that almost complete digestion and dissolution of solid byproduct can be effected, resulting in an effectively homogenous solution at room temperature.

We claim:

1. In a process for the polymerization of polytrimethylene terephthalate by esterification of terephthalic acid or dimethylterephthalate with 1,3-propanediol, precondensation of the esterification product to produce a precondensation product, and polycondensation of the precondensation product to produce polytrimethylene terephthalate wherein excess 1,3-propanediol is removed from the esterification and/or polycondensation stages and 1,3-propanediol vapor is separated from the high boiling fraction (solid byproduct) in a separation vessel, the improvement which comprises:

(a) heating the solid byproduct in the presence of about 5 ppm to about 5000 ppm, based on metal, of a metal catalyst selected from the group consisting of one or more 3rd, 4th, or 5th row metal compounds from Groups 3–12 and Groups 14–15 of the Periodic Table (IUPAC 1989) at a temperature of from about 100° C. to about 240° C. for from about 5 minutes to about 24 hours, optionally in the presence of a diluent, and (b) optionally, recycling the reaction product into the polymerization process.

2. The process of claim 1 wherein the metal catalyst is selected from the group consisting of La, Ti, Zr, V, Cr, Mn, Ru, Co, Ni, Zn, Sn, and Sb salts.

3. The process of claim 2 wherein the metal catalyst is selected from the group consisting of Ti, Sn, and Zn salts.

4. The process of claim 1 wherein the solid byproduct is transferred to a separate reaction vessel wherein step (a) takes place and the reaction is carried out at about 100° C. to about 220° C.

5. The process of claim 4 wherein the reaction of step (a) is carried out at about 120° C. to about 200° C.

6. The process of claim 1 wherein step (a) is carried out in the separation vessel and the reaction is carried out at about 140° C. to about 240° C.

7. The process of claim 6 wherein the reaction of step (a) is carried out at about 180° C. to about 240° C.

8. The process of claim 1 wherein the reaction of step (a) is carried out for from about 10 minutes to about 2 hours.

9. The process of claim 1 wherein the amount of the metal catalyst is from about 10 ppm to about 500 ppm, based on metal.

10. The process of claim 1 wherein basic catalysts are used in an amount of about 0.01 to about 2 wt percent, based on total catalyst.

11. The process of claim 10 wherein the basic catalyst is selected from the group consisting of the salts of the alkali and alkaline earth metals (Groups 1 and 2).

12. The process of claim 11 wherein the basic catalyst is selected from the group consisting of alkali or alkaline earth metal (Groups 1 and 2) hydroxide, carbonate, bicarbonate, and carboxylate salts.

13. The process of claim 1 wherein 1,3-propanediol vapor is separated from solid byproduct in vacuum condensers for the precondensation and/or polycondensation stages and the solid byproduct therefrom is transferred to a separate reaction vessel wherein the solid byproduct is heated in the presence of about 5 ppm to about 5000 ppm, based on metal, of a catalyst selected from the group consisting of one or more third, fourth, or fifth row metal compounds from Groups 3–12 and Groups 14–15 of the Periodic Table (IUPAC 1989) at a temperature of from about 100° C. to about 220° C. for from about 5 minutes to about 24 hours, optionally in the presence of a diluent, and the reaction product is optionally recycled into the polymerization process.

14. The process of claim 1 wherein separation of 1,3-propanediol vapor from solid byproduct is carried out in a separation vessel which is part of the esterification stage of the process and the solid byproduct is heated therein in the presence of about 5 ppm to about 5000 ppm, based on metal, of a catalyst selected from the group consisting of one or more third, fourth, or fifth row metal compounds from Groups 3–12 and Groups 14–15 of the Periodic Table (IUPAC 1989) at a temperature of from about 140° C. to about 240° C. for from about 5 minutes to about 24 hours, optionally in the presence of a diluent, and the reaction product is optionally recycled into the polymerization process.

15. In a process for the polymerization of polytrimethylene terephthalate by esterification of terephthalic acid or dimethylterephthalate with 1,3-propanediol, precondensation of the esterification product to produce a precondensation product, and polycondensation of the precondensation product to produce polytrimethylene terephthalate wherein 1,3-propanediol vapor is separated from the high boiling fraction (solid byproduct) in vacuum condensers for the precondensation and/or polycondensation stages and excess 1,3-propanediol and solid byproduct are removed, the improvement which comprises:

(a) transferring the solid byproduct from the vacuum condensers for the precondensation and/or polycondensation stages to a separate reaction vessel, (b) heating the solid byproduct in the reaction vessel in the presence of about 5 ppm to about 5000 ppm, based on metal, of a metal catalyst selected from the group consisting of one or more 3rd, 4th, or 5th row metal compounds from Groups 3–12 and Groups 14–15 of the Periodic Table (IUPAC 1989) at a temperature of from about 100° C. to about 220° C. for from about 5 minutes to about 24 hours, optionally in the presence of a diluent, and (c) optionally, recycling the reaction product into the polymerization process.

16. The process of claim 15 wherein the metal catalyst is selected from the group consisting of La, Ti, Zr, V, Cr, Mn, Ru, Co, Ni, Zn, Sn, and Sb salts.

17. The process of claim 16 wherein the metal catalyst is selected from the group consisting of Ti, Sn, and Zn salts.

18. The process of claim 15 wherein the reaction of step (a) is carried out at about 120° C. to about 200° C.

19. The process of claim 18 wherein the reaction of step (a) is carried out at about 140° C. to about 180° C.

20. The process of claim 15 wherein the reaction of step (a) is carried out for from about 10 minutes to about 2 hours.

21. The process of claim 15 wherein the amount of the metal catalyst is from about 10 ppm to about 500 ppm, based on metal.

22. The process of claim 15 wherein basic catalysts are used in an amount of about 0.01 to about 2 wt percent, based on total catalyst.

23. The process of claim 22 wherein the basic catalyst is selected from the group consisting of the salts of the alkali and alkaline earth metals (Groups 1 and 2).

24. The process of claim 23 wherein the basic catalyst is selected from the group consisting of alkali or alkaline earth metal (Groups 1 and 2) hydroxide, carbonate, bicarbonate, and carboxylate salts.

25. A process for the polymerization of polytrimethylene terephthalate comprising:

(a) esterification of terephthalic acid or dimethylterephthalate with 1,3-propanediol, (b) precondensation of the esterification product to produce a precondensation product, (c) polycondensation of the precondensation product to produce polytrimethylene terephthalate, (d) separation of 1,3-propanediol vapor from solid byproduct in a separation vessel which is part of the esterification stage of the process, (e) heating of the solid byproduct in the separation vessel of the esterification stage in the presence of about 5 ppm to about 5000 ppm, based on metal, of a metal catalyst selected from the group consisting of one or more 3rd, 4th, or 5th row metal compounds from Groups 3–12 and Groups 14–15 of the Periodic Table (IUPAC 1989) at a temperature of from about 140° C. to about 240° C. for from about 5 minutes to about 24 hours, optionally in the presence of a diluent, and (f) optional recycle of the reaction product into the polymerization process.

26. The process of claim 25 wherein the metal catalyst is selected from the group consisting of La, Ti, Zr, V, Cr, Mn, Ru, Co, Ni, Zn, Sn, and Sb salts.

27. The process of claim 26 wherein the metal catalyst is selected from the group consisting of Ti, Sn, and Zn salts.

28. The process of claim 25 wherein the reaction of step (a) is carried out at about 180° C. to about 240° C.

29. The process of claim 28 wherein the reaction of step (e) is carried out at about 210° C. to about 230° C.

30. The process of claim 25 wherein the reaction of step (e) is carried out for from about 10 minutes to about 2 hours.

31. The process of claim 25 wherein the amount of the metal catalyst is from about 10 ppm to about 500 ppm, based on metal.

32. The process of claim 25 wherein basic catalysts are used in an amount of about 0.01 to about 2 wt percent, based on total catalyst.

33. The process of claim 32 wherein the basic catalyst is selected from the group consisting of the salts of the alkali and alkaline earth metals (Groups 1 and 2).

34. The process of claim 33 wherein the basic catalyst is selected from the group consisting of alkali or alkaline earth metal (Groups 1 and 2) hydroxide, carbonate, bicarbonate, and carboxylate salts.

35. The process of claim 25 wherein excess 1,3-propanediol from the precondensation and/or polycondensation stages is recycled to the esterification stage separation vessel.

36. The process of claim 25 wherein solid byproduct is purged from the bottom of the esterification stage separation vessel and transferred to a separate reaction vessel wherein the solid byproduct is heated in the presence of about 5 ppm to about 5000 ppm, based on metal, of a metal catalyst selected from the group consisting of one or more third, fourth, or fifth row metal compounds from Groups 3–12, and Groups 14–15 of the Periodic Table (IUPAC 1989) at a temperature of from about 100° C. to about 220° for from about 5 minutes to about 24 hours, optionally in the presence of a diluent.

37. The process of claim 1 wherein the diluent is an alcohol or glycol.

38. The process of claim 37 wherein the diluent is 1, 13-propanediol.

39. The process of claim 15 wherein the diluent is an alcohol or glycol.

40. The process of claim 39 wherein the diluent is 1,3-propanediol.

41. The process of claim 25 wherein the diluent is an alcohol or glycol.

42. The process of claim 41 wherein the diluent is 1,3-propanediol.

43. The reaction product of step (b) of the process of claim 1 having a viscosity of less than about 500 mPa·s at 100° C.

44. The reaction product of step (b) of the process of claim 15 having a viscosity of less than about 500 mPa·s at 100° C.

45. The reaction product of step (e) of the process of claim 25 having a viscosity of Less than about 500 mPa·s at 100° C.

* * * * *